H. N. ANDERSON.
APPARATUS FOR MAKING GEARS.
APPLICATION FILED DEC. 18, 1917.
1,377,175.
Patented May 10, 1921.
2 SHEETS—SHEET 1.
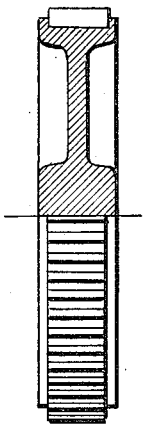
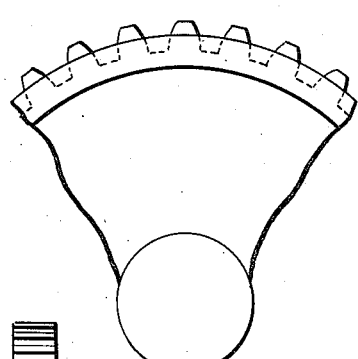
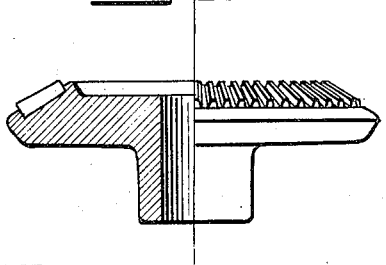
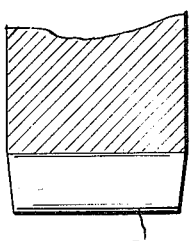
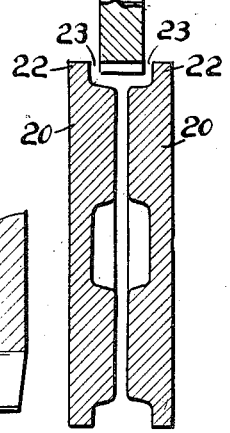
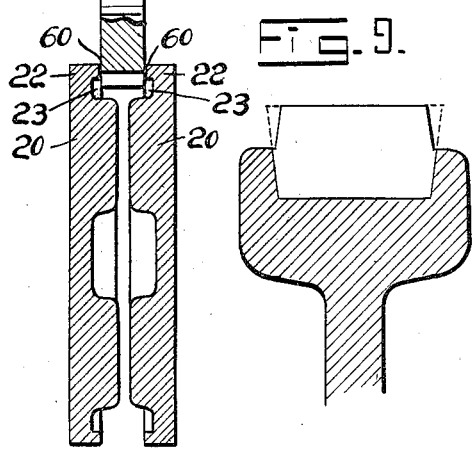
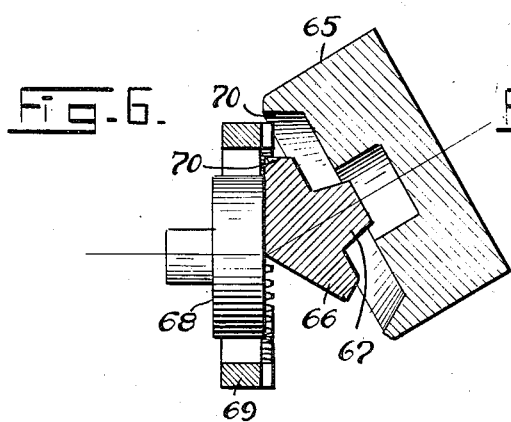
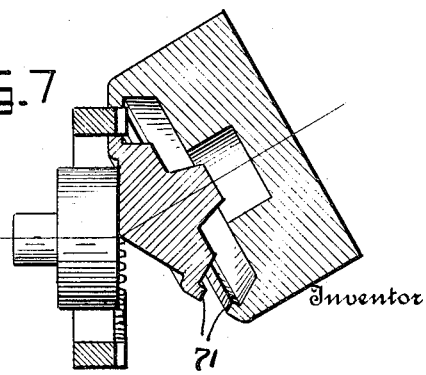
Inventor
Harold N. Anderson,
By Kerr, Page, Cooper & Hayward,
Attorneys.

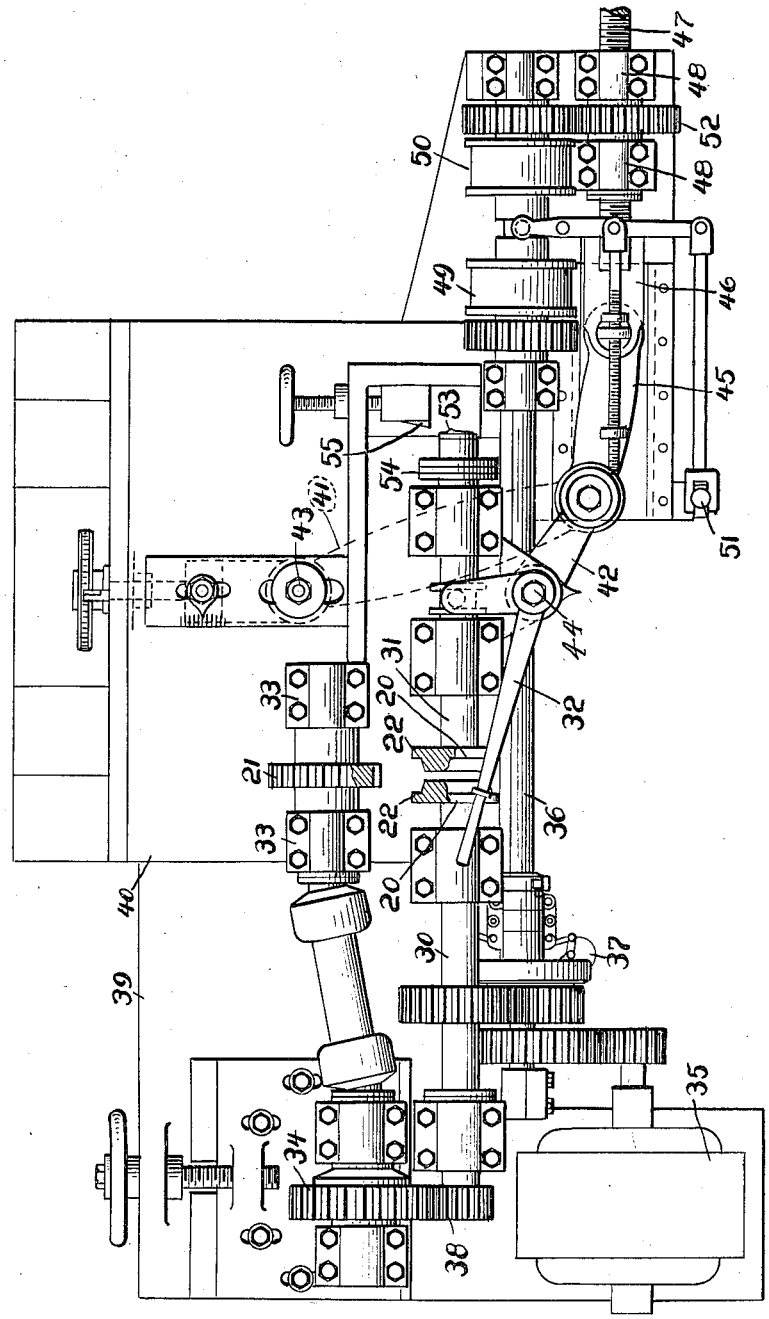

UNITED STATES PATENT OFFICE.

HAROLD N. ANDERSON, OF CLEVELAND, OHIO, ASSIGNOR TO THE ANDERSON PATENTS COMPANY, OF CLEVELAND, OHIO, A CORPORATION OF OHIO.

APPARATUS FOR MAKING GEARS.

1,377,175.     Specification of Letters Patent.     Patented May 10, 1921.

Application filed December 18, 1917. Serial No. 207,650.

*To all whom it may concern:*

Be it known that I, HAROLD N. ANDERSON, a citizen of the United States, residing at Cleveland, Cuyahoga county, Ohio, have invented certain new and useful Improvements in Apparatus for Making Gears, of which the following is a full, clear, and exact description.

My invention relates to shrouded gears composed of forged metal as distinguished from cast metal. Shrouded gears are well known in the mechanical art and are extensively used in certain classes of machinery, because of their great strength. Their use has heretofore been restricted, however, because of there being no way to make them, other than to cast them. Inasmuch as cast gears cannot be made very accurate, nor can their surfaces be made smooth and uniform, the use of shrouded gears has practically been limited to what is ordinarily classed as rough machinery.

In my several United States patents, among which are Nos. 1,001,799; 1,240,913; 1,240,914; 1,240,915; 1,240,916; 1,240,917 and 1,240,918, I have disclosed various machines for making gears by rolling a toothed die against a heated blank. By this means I have made spur and bevel gears; also herring bone gears. My present invention is a method of making shrouded gears by the rolling process. As a result of the rolling the metal in the teeth is very compact and free from flaws; it is in fact what is known as mechanically refined. This mechanical refinement removes most of the "blow holes" and other imperfections, and those which are not removed are flattened and orientated in such a way as to be rendered inocuous. The metal is also hardened to a greater or less extent by the action of the die, and its wearing qualities very much improved. Because of the heated condition of the blank at the time the teeth are being formed the finished gear is practically free from internal stresses which would tend to distort it if subjected to heat treatment.

In the accompanying drawings,

Figure 1 is a face view of a shrouded spur gear, partly in section.

Fig. 2 is a side view of a fragment of a shrouded spur gear.

Fig. 3 is a side view of a shrouded bevel gear.

Fig. 4 is a sectional view of a holder for spur gear blanks.

Fig. 5 is a sectional view of a modified form of holder for spur gears.

Fig. 6 is a sectional view of a holder for bevel gears.

Fig. 7 is a sectional view of a modified form of holder for bevel gears, the modification resembling the modification shown in Fig. 5.

Fig. 8 shows a fragment of a die, illustrating the beveling of the teeth to facilitate its withdrawal from the blank.

Fig. 9 shows a fragment of a gear, illustrating the effect on the gear of beveling the die teeth.

Fig. 10 is a gear rolling machine.

The operation of rolling gears is briefly this: A heated blank is inserted in a rotatable support or holder, and the holder rotated. A rotating toothed roll is then pressed against the heated blank, the holder and roll being gradually brought closer together, causing the teeth of the toothed roll or die to sink into the metal of the blank and form teeth conjugate to its own teeth. The original diameter of the blank may be about equal to the pitch-diameter of the gear to be made from it, the metal displaced by the die to form the dedenda of the teeth about equaling the metal necessary to form the addenda. I have found that confining the metal at the sides of the tooth-receiving zone of the blank aids materially in the formation of the teeth and improves the quality of the metal of which they are composed. I at first confined the metal closely, making no provision for excess metal. This, however, necessitates the blanks containing just the correct amount of metal. If the blank has too little metal the teeth will not be filled out. If there is too much metal, the excess, having no lateral outlet, is carried around the blank by the die; i. e., it flows ahead of the die, so to speak, and inequality or other imperfections in the teeth may result. After long and costly experimentation I have found that a limited lateral outlet for the metal is not inimical to the process. That is, I have found that a limited space at the sides of the tooth-receiving zone of the blank, into which excess metal can flow, affords all of the advantages of confinement of the metal, while entirely eliminating the difficulties which may arise from the presence of excess metal. Thus the problem of uniformity and precision in the blanks was solved, and what is more important I have discovered a new method of making shrouded gears.

In Fig. 4 is illustrated, rather diagrammatically, the preferred form of blank-holder. This holder comprises the disks 20—20 between which the blank is clamped. The disks are preferably formed complementary to the contour of the blank, so that they fully support the blank. The die-roll 21 is shown in the position it occupies at the time the rolling of the blank is completed. The disks have extensions 22 between which the die operates, but the distance between the extensions is sufficient to leave a space 23 at each side of the die. The metal of the blank may extend more or less into these spaces in the beginning or it may not. This is practically immaterial, so long as the blank contains sufficient metal. The perimeter of the space being open, superfluous metal is permitted to flow toward the axis of the die. The spaces 23 need not be as broad as they are shown in the drawings, a comparatively small space being sufficient to allow the escape of superfluous metal. But for making shrouded gears a broader space is provided. After the gears are rolled they are mounted in a lathe to be turned. If the shrouds are not to be retained they are turned off. If they are to be retained its periphery is turned down to or slightly below the pitch-line, the finished gear being shown in Fig. 1. It is only necessary, of course, to turn the shrouds down to the pitch-line where two shrouded gears are to be run together. Otherwise the shrouds may extend to the ends of the teeth. This, of course, is well understood by those who use shrouded gears.

In Fig. 10 I show the blank-holder and die-roll mounted in a gear rolling machine. One of the disks 20 is rigidly secured on the end of the shaft 30, and the other is secured to the end of shaft 31, this shaft being movable endwise to let in the blank by means of the lever 32. The die-roll is mounted on a shaft journaled in bearings 33—33, which is driven through universal joints by a gear 34. A motor 35 is arranged to constantly rotate shaft 36, and by means of a clutch 37 and train of gears drives shaft 30, a gear 38 on the end of shaft 30 driving gear 34. All of the mechanism so far mentioned, except the bearings 33—33, is mounted on the base 39. Bearings 33 are mounted on a table 40 arranged to slide transversely with reference to the shafts on the base. A toggle composed of links 41 and 42, the former pivoted at 43 to the table 40, the latter pivoted at 44 to the base 39, is connected by a link 45 and cross head 46 to the screw 47, which is mounted to slide but not rotate in bearings 48—48. By means of clutches 49 and 50, controlled by a vertical lever 51, the gear 52 may be rotated in either direction by the shaft 36. The hub of this gear is threaded to fit the screw and being confined between the bearings 48—48 rotation of the gear moves the screw endwise in one direction or the other, according to the direction of rotation of gear 52. Movement of the screw to the left, as seen in the drawing, brings the links of the toggle into parallelism and draws the table 40 toward the shaft 30, thereby pressing the rotating die into the blank. At its right hand end the shaft 31 carries a cam or ramp 53 which is connected to the shaft through a ball thrust bearing 54, the ramp being kept from rotating by means not seen in this view. Mounted on the table 40 is a lug 55 which is adapted to engage the ramp before the die reaches the blank and by forcing the shaft 31 endwise clamp the blank firmly between the disks 20—20, the ramp 53 and lug 55 continuing in engagement while the rolling operation continues. Other views of this machine and a more extended description may be found in my Patent No. 1,240,915, issued September 25, 1917.

In Fig. 5 I show a modification, wherein there is no perimetrical opening, the inwardly turned flanges 60—60 on the extensions 22—22 approaching so close to each other as to leave just room enough for the die between them.

In Fig. 6 I show an arrangement for rolling bevel shrouded gears. The apparatus here shown is intended to be used on a machine similar to the one shown in my Patent No. 1,240,916, and comprises a holder 65, mounted on a rotatable shaft (not shown) recessed to receive the blank. A conical block 66 is adapted to set on the blank and is provided with a dowel 67 to enter a hole in the center of the blank. The block is pressed against the blank and the blank thus clamped in the holder by a circular, flat faced, block 68, which is mounted on the end of a rotatable longitudinally movable plunger (not shown). The die 69 consists of a crown gear cut on the end of a cylindrical ring, which is mounted and moved longitudinally by means not shown. The die is shown in the position it occupies at the termination of the tooth forming operation and it is seen that its teeth operate between elements which limit the lateral flow of metal just as has been described in connection with Fig. 4. That is, there are spaces 70 at the sides of the tooth receiving zone of the blank, which spaces have perimetrical openings similar to those in Fig. 4. A bevel gear made in this kind of a holder is shown in Fig. 3.

In Fig. 7 the holder and conical block are provided with flanges 71 which close the perimetrical opening as has been described in connection with Fig. 5.

In Fig. 8, which illustrates a fragment of a spur gear die, the teeth are beveled to give them draft, facilitating their withdrawal from the blank during the rolling operation. Fig. 9 shows the effect of this on the blank. In dotted lines the shape of the tooth as it comes from the holder is shown, it being understood that the shrouds will also extend out farther than shown in the figure. The shrouds are turned down to the pitch-line and the teeth are beveled from the pitch-line outward so as to permit their entrance into the mating gear, which is supposed to have also been formed with a beveled die-roll. In order to provide clearance and allow for a little side play of the gears the addenda of the teeth are made slightly narrower than the space they enter in the mating gear.

It is to be understood that my invention is not limited in its application to the specific embodiments illustrated. It is only limited by the scope of the appended claims.

What I claim is as follows:

1. In a machine for rolling gears, a holder for blanks which extends at each side of the tooth-receiving zone of the blank so that the tooth-forming die must operate between the extensions, the space between said extensions being wider than the die and having perimetrical openings through which excess metal may escape.

2. In a machine for rolling gears, a holder for blanks and elements on each side of the tooth-receiving zone of the blank, whereby lateral flow of the metal of the blank is limited, the distance between said elements being greater than the width of the tooth-receiving zone, thereby providing spaces for metal outside of said zone, said elements being so formed as to afford an outlet for metal in excess of the capacity of said spaces.

3. In a machine for rolling bevel gears, a pair of members adapted to receive between them and thereby support a bevel gear blank while teeth are being rolled thereon, said members having extending portions that lie at the sides of the tooth-receiving zone of the blank, but removed therefrom so as to provide limited spaces for metal outside of the tooth-receiving zone; said portions that lie at the sides of the tooth-receiving zone having different proportions, whereby one is adapted to lie at the inside and the other at the outside of said zone.

4. In a machine for rolling bevel gears, a pair of members adapted to receive between them and thereby support a bevel gear blank while teeth are being rolled thereon, said members having extending portions that lie at the sides of the tooth-receiving zone of the blank, but removed therefrom so as to provide limited spaces for metal outside of the tooth-receiving zone; said portions that lie at the sides of the tooth-receiving zone having different proportions, whereby one is adapted to lie at the inside and the other at the outside of said zone, said elements being so formed that the space between them quite to their edges is broader than said tooth receiving zone, thereby affording an outlet for metal in excess of the capacity of said spaces.

5. In a machine for rolling gears, elements between which the active teeth of the tooth-forming die and tooth-receiving zone of the blank lie while the die is operating on the blank, the space between said elements being broader than the die and having a perimetrical opening through which superfluous metal may escape.

6. In a machine for rolling gears, a pair of members between which to clamp a blank, having extended portions between which the tooth-receiving zone of the blank lies, the distance between said extensions being broader than said zone, thereby providing spaces for metal outside of said zone, said extensions being so formed as to afford an outlet for metal in excess of the capacity of said spaces, means for moving one of said members longitudinally to clamp the blank, means for rotating the members with the blank clamped between them; a die roll, means independent of the blank for rotating it, and means for producing relative movement of approach between the rotating die-roll and said rotating members.

7. In a machine for rolling gears, a holder for blanks which provides support for the tooth-receiving zone of the blank, to prevent recession of the metal in the direction of the die pressure; and elements stationed on each side of the tooth-receiving zone to limit the lateral flow of the metal, said elements being farther apart than the width of said zone and so formed as to permit escape of excess metal in a direction other than lateral.

8. In a machine for rolling gears, a pair of elements between which the tooth-receiving zone of a blank lies while the teeth are being formed, said elements being separated from said zone by spaces which permit a limited lateral extension of the blank beyond the toothed zone, said elements being so formed as to afford an outlet for metal in excess of the capacity of said spaces, a tooth-forming die, and means independent of contact between the die and blank for producing relative movement between the die and blank whereby to form teeth on the blank.

9. In a machine for rolling bevel gears, means for supporting a bevel gear blank while teeth are being rolled thereon, and elements at each side of the tooth receiving zone of the blank but removed therefrom so as to afford space for metal outside of said zone, said elements having different forms, whereby one is adapted to serve at the side nearest to and the other at the side farthest from the axis of the blank.

In testimony whereof I affix my signature in the presence of two subscribing witnesses.

HAROLD N. ANDERSON.

Witnesses:
R. W. TOUZEAU,
WM. BOHLEBER.